United States Patent [19]

McCarthy et al.

[11] Patent Number: 5,666,509
[45] Date of Patent: Sep. 9, 1997

[54] DATA PROCESSING SYSTEM FOR PERFORMING EITHER A PRECISE MEMORY ACCESS OR AN IMPRECISE MEMORY ACCESS BASED UPON A LOGICAL ADDRESS VALUE AND METHOD THEREOF

[75] Inventors: Daniel M. McCarthy; Joseph C. Circello, both of Phoenix; Richard Duerden; Gregory C. Edgington, both of Scottsdale, all of Ariz.; Cliff L. Parrott; William B. Ledbetter, Jr., both of Austin, Tex.

[73] Assignee: Motorola, Inc., Schaumburg, Ill.

[21] Appl. No.: 216,998

[22] Filed: Mar. 24, 1994

[51] Int. Cl.$^6$ .................................................. G06F 12/10
[52] U.S. Cl. ............................ 711/206; 711/207; 711/202
[58] Field of Search .................................. 395/375, 400, 395/425, 250, 472, 471, 470, 416, 417, 412, 825; 364/200

[56] References Cited

U.S. PATENT DOCUMENTS

| | | | |
|---|---|---|---|
| 4,473,878 | 9/1984 | Zolnowsky et al. | 395/418 |
| 4,763,250 | 8/1988 | Keshlear et al. | 395/418 |
| 4,975,870 | 12/1990 | Knicely et al. | 395/479 |
| 5,006,980 | 4/1991 | Sanders et al. | 395/395 |
| 5,075,846 | 12/1991 | Reininger et al. | 364/400 |
| 5,119,485 | 6/1992 | Ledbetter, Jr. et al. | 395/473 |
| 5,155,824 | 10/1992 | Edenfield et al. | 395/470 |
| 5,197,144 | 3/1993 | Edenfield et al. | 395/470 |
| 5,218,678 | 6/1993 | Kelleher et al. | 395/825 |
| 5,278,961 | 1/1994 | Mueller | 395/416 |
| 5,287,484 | 2/1994 | Nishii et al. | 395/471 |
| 5,301,287 | 4/1994 | Herrell et al. | 395/412 |
| 5,317,720 | 5/1994 | Stamm et al. | 395/470 |
| 5,440,708 | 8/1995 | Takagi | 395/418 |
| 5,446,862 | 8/1995 | Ohkami | 395/427 |
| 5,579,505 | 11/1996 | Ohkami | 395/482 |

OTHER PUBLICATIONS

Mike Muller, "ARM6 a High Performance Low Power Consumption Macrocell", 1993 IEEE, pp. 80–87.

Hennessy et al., "Computer Architecture . . . ", 1990, pp. 280–287.

Clements, "Microprocessor Systems Design", 1987 pp. 220–223.

Primary Examiner—William M. Treat
Assistant Examiner—Kenneth R. Coulter
Attorney, Agent, or Firm—Keith E. Witek

[57] ABSTRACT

A processor (10) has a data cache unit (16) wherein the data cache unit includes a memory management unit (MMU) (32). The MMU contains memory locations within transparent translation registers (TTRs), an address translation cache (40), or a table walk controller (42) which store or generate cache mode (CM) bits which indicate whether a memory access (i.e., a write operation) is precise or imprecise. Precise operations require that a first write operation or bus write instruction be executed with no other operations/instructions executing until the first operation/instruction completes with or without a fault. Imprecise operations are operations/instruction which may be queued, partially performed, or execution simultaneously with other instructions regardless of faults or bus write operations. By allowing the logical address to determine whether the bus write operation is precise or imprecise, a large amount of system flexibility is achieved.

20 Claims, 9 Drawing Sheets

DATA PROCESSING SYSTEM FOR PERFORMING EITHER A PRECISE MEMORY ACCESS OR AN IMPRECISE MEMORY ACCESS BASED UPON A LOGICAL ADDRESS VALUE AND METHOD THEREOF

FIELD OF THE INVENTION

The present invention relates generally to data processing systems, and more particularly, to write and push buffer management using cache mode bits in a data processing system.

BACKGROUND OF THE INVENTION

In a computer system, a computer system process (i.e. program) may need to know that a specific external write operation has completed without a fault before proceeding with other computer operations. For this case, the fault information must be reported on the computer instruction that generated the faulted operation and this reporting must occur before the next instruction is executed by the computer system. This is called a precise fault model due to the fact that the fault can be directly associated with the execution of a single computer operation. When performing precise writes, the processor must stall until the external write instruction/operation completes. For other external writes, it is acceptable for the external fault information to not be linked directly to the instruction that caused the faulted write operation. This is called an imprecise fault model.

Performance can be improved for imprecise writes by decoupling the processor portion of the write operation from the external portion of the write operation. Precise writes must not be allowed to separate these operations. A method is needed to give the user sufficient control of the fault model applied to a given write operation to allow precise or imprecise operation as needed.

SUMMARY OF THE INVENTION

The previously mentioned disadvantages are overcome and other advantages achieved with the present invention. In one form, the present invention comprises a data processing system having a central processing unit (CPU) and a memory management unit (MMU) coupled to the CPU. The MMU translates logical addresses to physical addresses for accessing a plurality of memory pages. The memory management unit provides at least one cache mode bit which indicates whether a write operation is to be precise or imprecise depending upon which memory page is accessed.

In another form, the invention comprises a method for determining whether to perform a precise memory write access or an imprecise memory write access in a data processor. The method begins by decoding a data processor instruction to determine that the data processor instruction requires a memory write operation. A logical address is provided wherein the logical address indicates which memory location is written. The logical address is translated to a physical address. At least one cache mode bit is provided in response to receiving the logical address. The at least one cache mode bit is either asserted or deasserted based upon at least one bit of the logical address. The at least one cache mode bit is used to perform one of either a precise write operation or an imprecise write operation.

In yet another form, the invention comprises a method for resolving precise and imprecise faults in a data processing system.

The present invention will be more clearly understood from the detailed description below in conjunction with the accompanying drawings.

Figure 1:
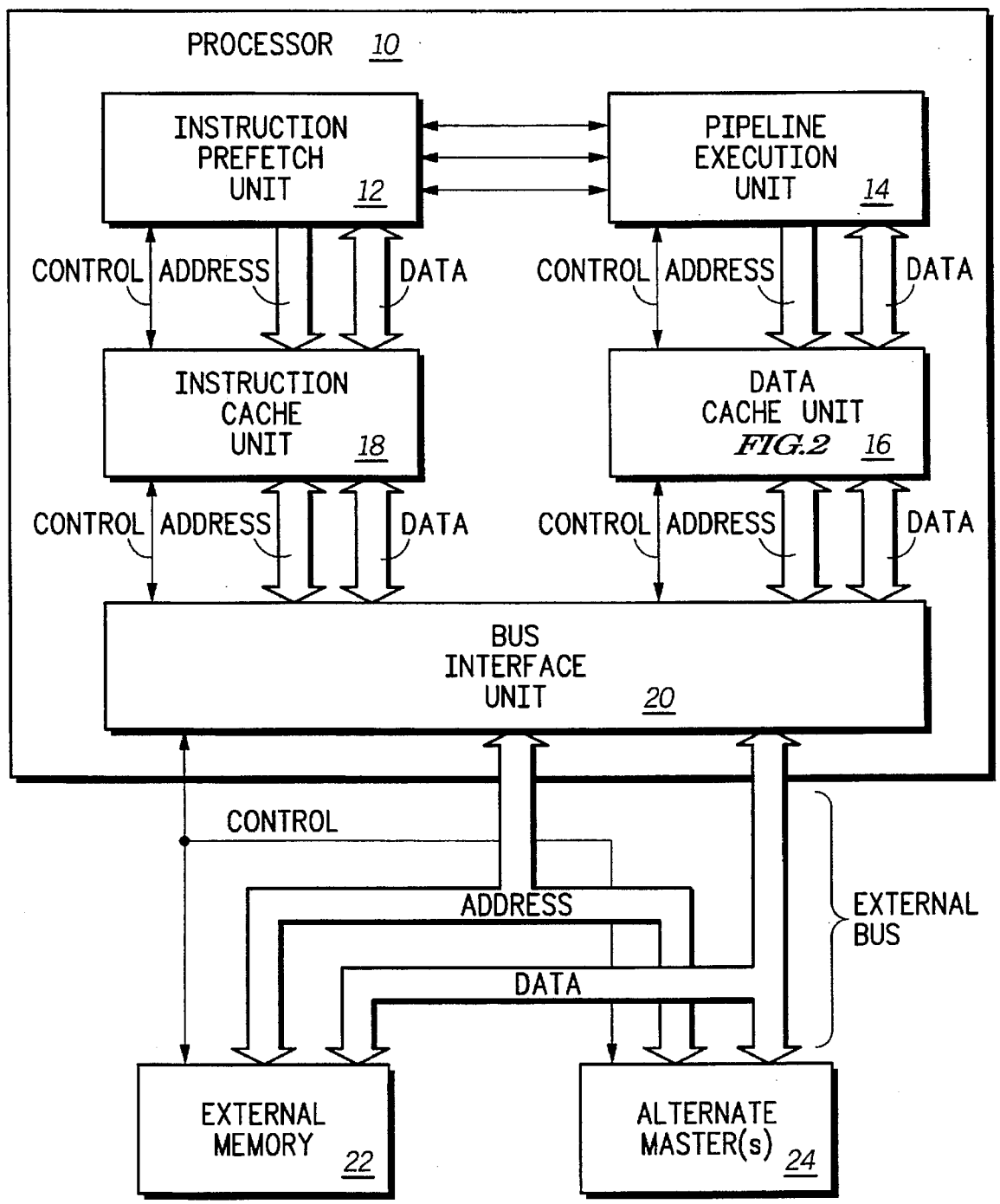
FIG. 1 illustrates, in a block diagram, a data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

The previously mentioned disadvantages are overcome and other advantages achieved with the present invention. In one form, the present invention gives the programmer the ability to control a fault model applied to a given write operation in a computer system or integrated circuit. The programmer can make the write fault model either precise or imprecise on a virtual address basis. Based on the fault model, the highest performance hardware that supports that fault model is used to perform the external write operation. That is, a write buffer and a push buffer are used for imprecise writes to decouple the processor-controlled portion of a write operation from the external-controlled portion of the write operation while these buffers are bypassed by precise write operations. This improves performance while providing the fault resolution needed by a human computer programmer.

Generally, the present invention provides a data processing system and a method for providing cache mode bits which are used to indicate precise bus/memory accesses or imprecise bus/memory accesses. In addition, the data processing system provided herein allows for the processing of precise and imprecise faults which occur in close proximity in time. The data processing system and data processor taught herein has a copy-back mode data cache with a write buffer and a push buffer. In particular, the present invention gives the programmer the ability to control a fault model which is applied to a given write operation. The programmer can make the write fault model precise or imprecise on a virtual address basis (i.e., whether the write operation is precise or imprecise depends upon a range in which the logical address resides).

Precise operations require that a first write operation or bus write instruction be executed with no other operations/instructions executing until the first operation/instruction completes with or without a fault. Imprecise operations are operations/instructions which may be queued, partially performed or executed simultaneously with other instructions regardless of faults or bus write operations. Again, the logical address determines whether the bus write operation is precise or imprecise. Based on the fault model, the highest performance hardware that supports that fault model is used to perform the external operation. That is, a write buffer and a push buffer are used for an imprecise write to decouple the processor portion of a write from the external portion of the write while these buffers are bypassed by precise write operations. The write buffer is designed into a data processor which has a data cache capable of operating in a copy-back mode and processes both precise and imprecise faults occurring either simultaneously or in close proximity in a novel manner.

The present invention can be more fully understood with the references to the FIGS. 1–14 herein. FIG. 1 generally illustrates a data processor 10 with an external bus connected to external memory 22 and other optional external bus masters 24.

Figure 2:
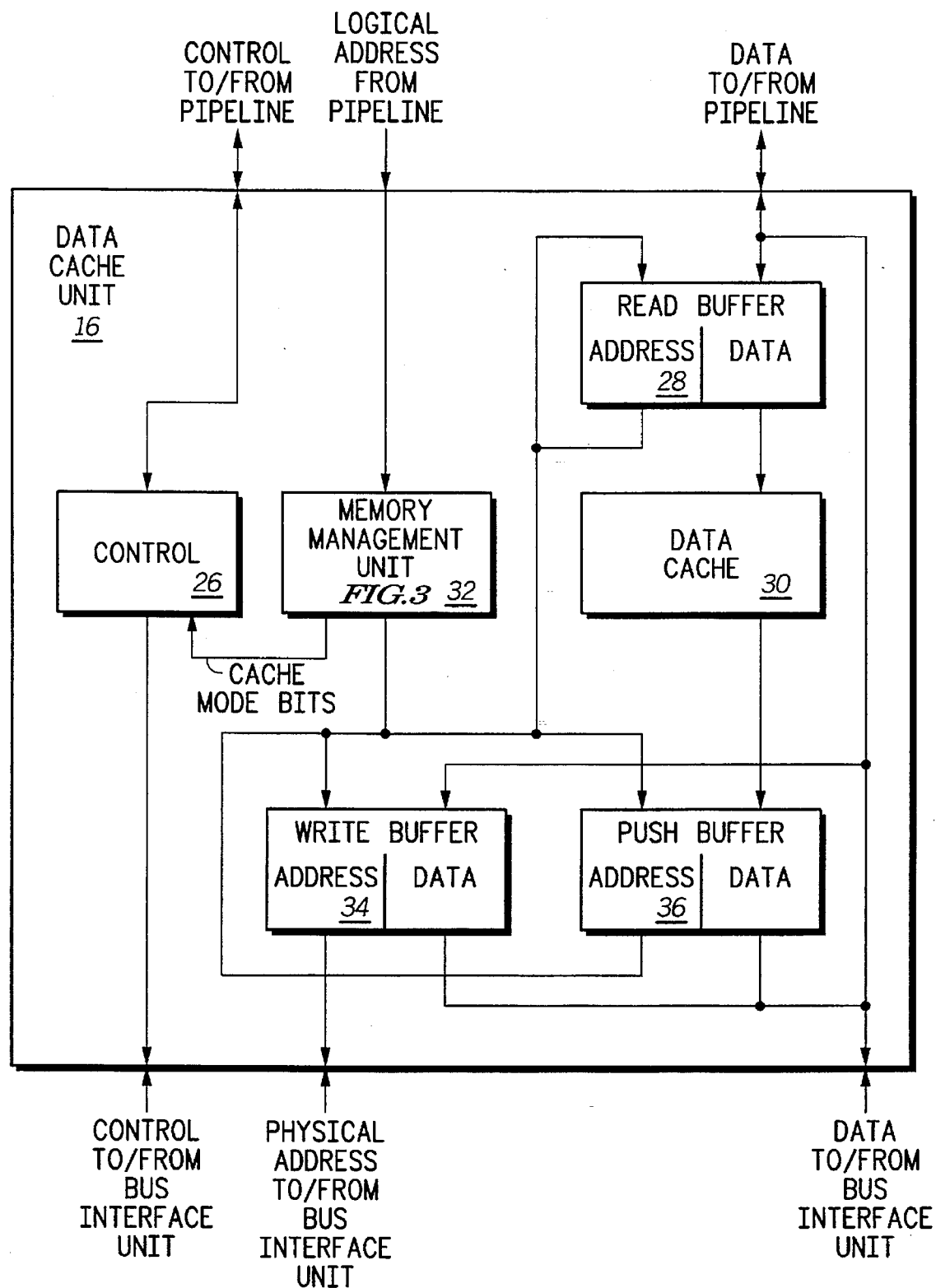
FIG. 2 illustrates, in a block diagram, the data cache unit of FIG. 1 in accordance with the present invention.

The processor 10 has an instruction prefetch unit 12 which fetches instructions which are stored in an instruction cache 18. A pipeline execution unit 14 is used to execute instructions fetched by the unit 12. The pipeline execution unit 14 makes necessary operand requests to a data cache unit 16. A bus interface unit (BIU) 20 is used to access external memory to provide a stream of data and instructions from the external bus to the cache units 16 and 18. FIG. 2 illustrates the data cache unit 16 of FIG. 1 in greater detail.

The data cache unit 16 is connected to both the pipeline execution unit 14 and the BIU 20. For instructions that have operand references (some instructions may have no operands), the pipeline execution unit 14 sends to the data cache unit 16 the operand logical address of operand(s) on the address from pipeline lines, control information on the control to/from pipeline lines and receives data for read operation or sends data for write operations on the data to/from pipeline lines. The control information (control lines between the units 14 and 16) consists of a read indicator, a write indicator, an operand size field, a function code field, a fault processing field, instruction type field and other information. For data cache unit 16 requests to the BIU 20, the data cache unit sends the request control information on the control to/from BIU lines, the physical address on the address to/from BIU lines and receives data for read type commands or sends data for write type commands on the data to/from BIU lines. The control information consists of a read/write indicator and other information.

In FIG. 2, the data cache unit has a control unit 26. A memory management unit (MMU) 32 is used for logical address to physical address translation and for providing address status bits. Specifically shown are the cache mode (CM) bits. A data cache 30 is used to hold data from recently accessed memory location(s) to provide improved performance on subsequent access to these locations. A read buffer 28 is used to hold data to be stored in the data cache 30 and to hold the physical address associated with this data. Data and address information is loaded in the read buffer 28 for pipeline execution unit 14 on write operations that need to update the cache or for cache line loads (reading/writing a line of values from a cache) from the BIU 20 from cache misses. A write buffer 34 is used to hold write information for imprecise write operations external to the processor 10. The information consists of the write physical address, the write data and associated write command information for the BIU 20. A push buffer 36 is used to hold a line of cache data and its associated physical address that is to be sent to the BIU 20 to be written to an external device (such as memory 22 or an alternate master 24 via the external bus of FIG. 1).

Figure 3:
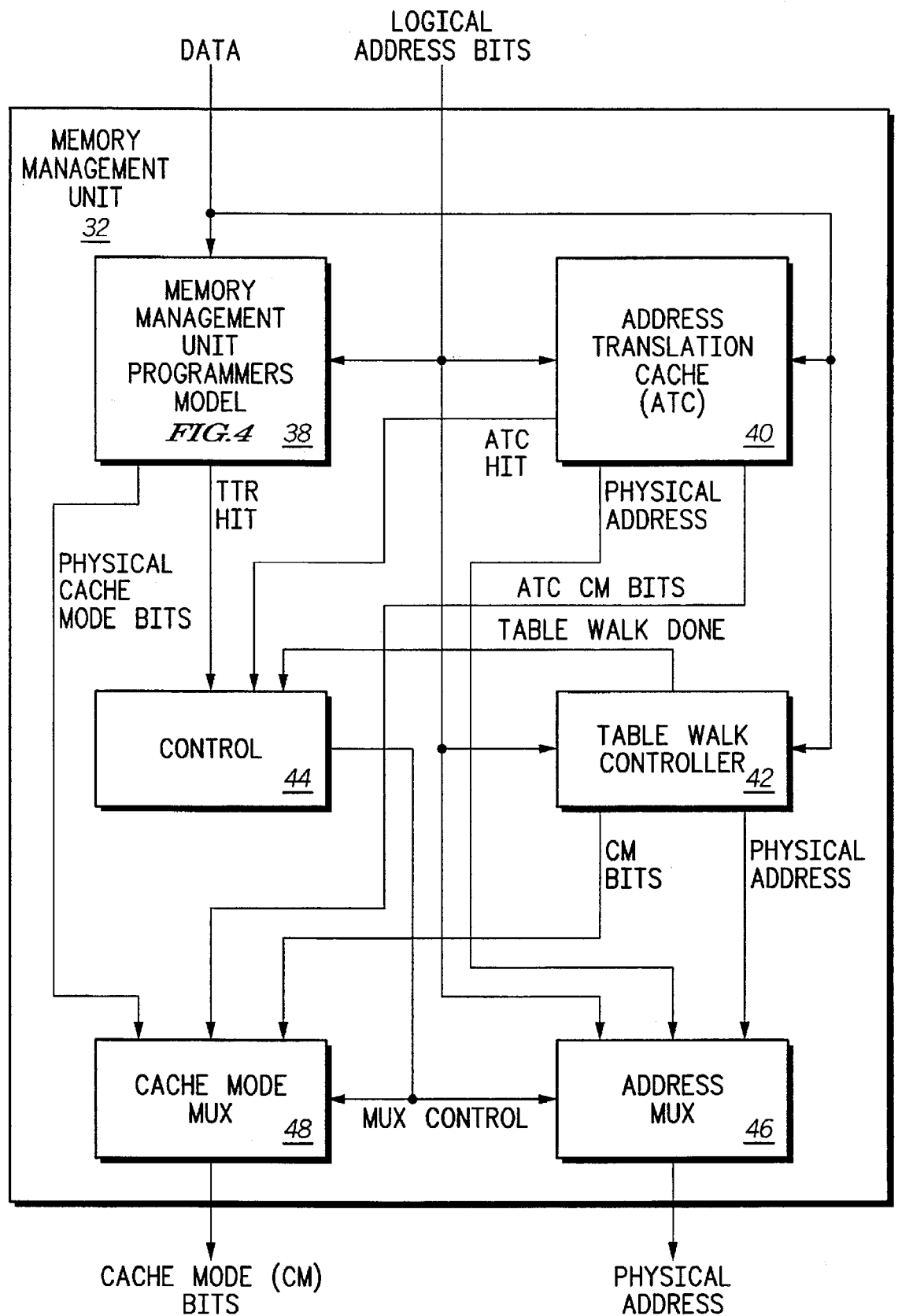
FIG. 3 illustrates, in a block diagram, the memory management unit (MMU) of FIG. 2 in accordance with the present invention.

FIG. 3 illustrates in detail the MMU (memory management unit) 32 of FIG. 2. The principle function of the MMU 32 is to translate the logical addresses provided by pipeline execution unit 14 to physical address. The MMU 32 also provides status bits on a logical page basis. Many MMUs exist in the art and may be used with processor 10. In a preferred form, FIG. 3 illustrates, in more detail, the MMU 32 of FIG. 2.

MMU 32 has a MMU Programmer's model 38 which contains registers that can be accesses by the user to control and set the functions of various functions in the data cache unit 16. The details of the MMU programmer's model 38 will be shown in FIG. 4. A tablewalk controller 42 is used to translate logical addresses to physical addresses and obtain status and control bits on a logical memory page basis. An address translation cache (ATC) 40 is used to retain copies of recently translated addresses along with their status and control information for quick address translation access. A physical address and its associated status and control information stored in the ATC 40 can be provided by the MMU 32 as an output physical address and cache mode bits faster than the tablewalk controller 42 can translate a logical address to a physical address. Therefore, the ATC 40 is used for the purpose of improved performance of address translation.

The MMU 32 also contains an address mux 46 which is used to select among the various sources of a translated physical address. The three possible sources are the physical address from the ATC 40, the physical address from the tablewalk controller 42, and the logical address which is an input to the MMU 32. A control logic block 44 operates the address mux 46. The control logic block receives virtual mode enable and transparent translation register (TTR) hit signals from the MMU programmer's model 38, address translation cache hit signal from the ATC 40 and table walk complete status from the table walk controller 42. The control logic block 42 selects the address mux 46 output as follows (in priority order):

1. If the logical address matches a value stored in a valid TTR, then the physical address is set to the logical address from the TTR (see FIG. 4), else
2. if virtual mode is enabled and the ATC 40 has a hit, then the physical address is set to the physical address output of the ATC 40, else
3. if virtual mode is enabled and the ATC 40 has a miss, then the physical address is set to the physical address obtained by the tablewalk controller 42, else
4. a default translation occurs and the physical address is set to be logical address.

The MMU 32 also contains a cache mode mux 48 which is used to select among the various sources of cache mode information. The possible sources are the cache mode field from the ATC 40, the cache mode field in the page table entry (PTE) from the tablewalk controller 42, and the cache model field sourced by the MMU programmers model. The control logic block 44 operates the cache mode mux 48. The control logic block receives virtual mode enable and transparent translation register (TTR) hit signals from the MMU programmer's model 38, address translation cache hit signal from the ATC 40, and table walk complete status from the table walk controller 42. The control logic block 42 selects the cache mode mux 48 output as follows (in priority order):
1. If the logical address matches one (or more) valid TTR(s), then the effective cache mode is set to the CM field value of the lowest order matching TTR, else
2. if virtual mode is enabled and the ATC 40 has a hit, then the effective cache mode is set to the cm field output of the ATC 40, else
3. if virtual mode is enabled and the ATC 40 has a miss, then the effective cache mode is set to the CM field obtained by the tablewalk controller 42, else
4. a default translation occurs and effective cache mode is set to the CM field value of the TC register 132.

Figure 4:
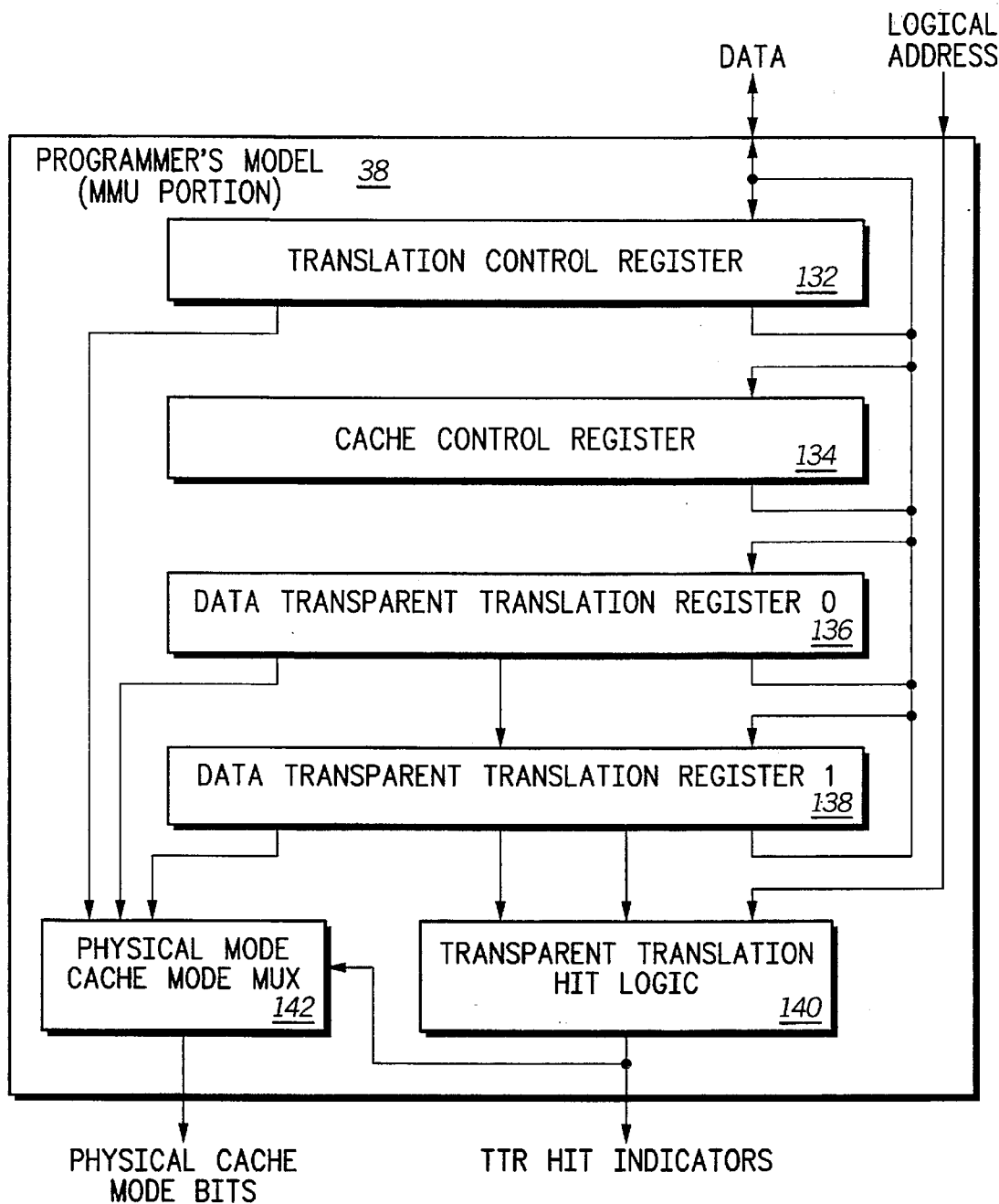
FIG. 4 illustrates, in a block diagram, an MMU portion of a programmer's model in accordance with the present invention.

FIG. 4 illustrates the Programmer's Model (MMU portion) 38 of FIG. 3 in more detail. The principle functions of the MMU Programmer's Model 38 are to register control information for the MMU 32 and Data Cache 30, to provide TTR hit information (for data transparent translation registers [DTTRs] 136 and 138) and to select the physical mode address status bits, also referred to as the physical cache mode bits. In a preferred form, FIG. 4 illustrates, in more detail, the MMU Programmer's model of FIG. 3.

Figure 6:
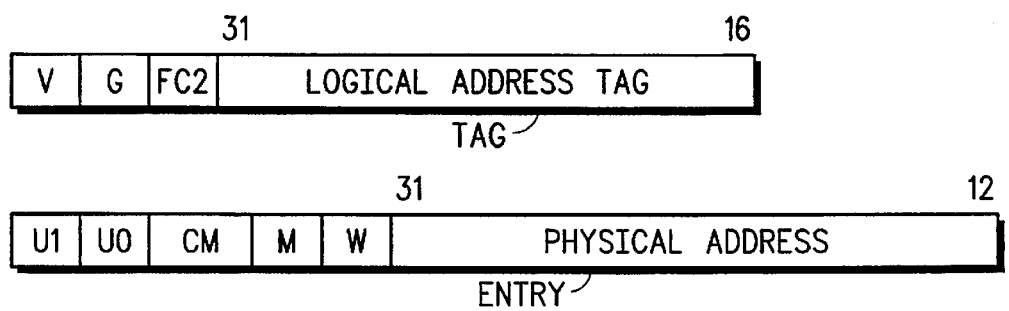
FIG. 6 illustrates, in a block diagram, logical and physical address entries used in an address translation cache in accordance with the present invention.

FIG. 6 illustrates a typical format used by the ATC 40 to store tags and logical address as discussed above in FIG. 3. FIG. 6 also illustrates the format of the physical addresses and physical tags used by the MMU 32. Other logical and physical addresses and tags are known in the art and may be used in FIG. 6. FIG. 6 illustrates a logical address which has a V bit tag. The V bit, when set, indicates that the address or the entry in the ATC 40 is a valid address and also indicates that the address is non-global. The V bit is set when the MMU 32 performs a valid translation. A software instruction known as a PFLUSH may be used to clear the V bit thereby invalidating an entry in the ATC 40.

The logical address tag has a G bit tag which, when set, indicates that the logical address is valid and global. The V bit and the G bit are never both simultaneously in a set state for a given translation. The logical address has an FC2 (Function Code Bit 2) tag illustrated in FIG. 6. The FC2 bit contains a function code corresponding to the logical address in the ATC entry. FC2 is set for supervisor mode accesses and cleared for user mode accesses. The bits 31 to 16 indicate a logical address bit tag.

The logical address has a sixteen bit field (bits 31 to 1) that contains the most significant bits of the logical address. All sixteen bits are used via ATC/tablewalk comparisons within the MMU 32 when the MMU page size is 4K bytes. For 8K byte pages, the least significant bit of the sixteen bit field is ignored in MMU comparisons.

The physical address has a U1 (User Page Attribute 1) bit tag. The U1 bit is not interpreted by the processor 10 but is echoed to a UPA1 pin on the processor 10 when accesses generate external bus transfers (e.g. when the address misses the on-chip cache, when the Cache Inhibit bit is set, etc.). The UPA1 may be used as a chip select in some designs. A bit U0 (User Page Attribute 0) functions in a manner similar to the U1 bit tag.

CM (Cache Mode) contains two bits and is used to select the cache mode for a page of memory.

M (Modified Bit) tag is a bit which is set when a valid write access to the logical address corresponding to the ATC entry occurs. A W tag bit is a write protect tag bit. A write access or a read-modify-write access to the logical address (i.e. ATC entry) having a set W bit causes an access error exception to be taken immediately. The portion labeled "physical address" in FIG. 6 is the upper bits of the translated physical address.

Figure 5:
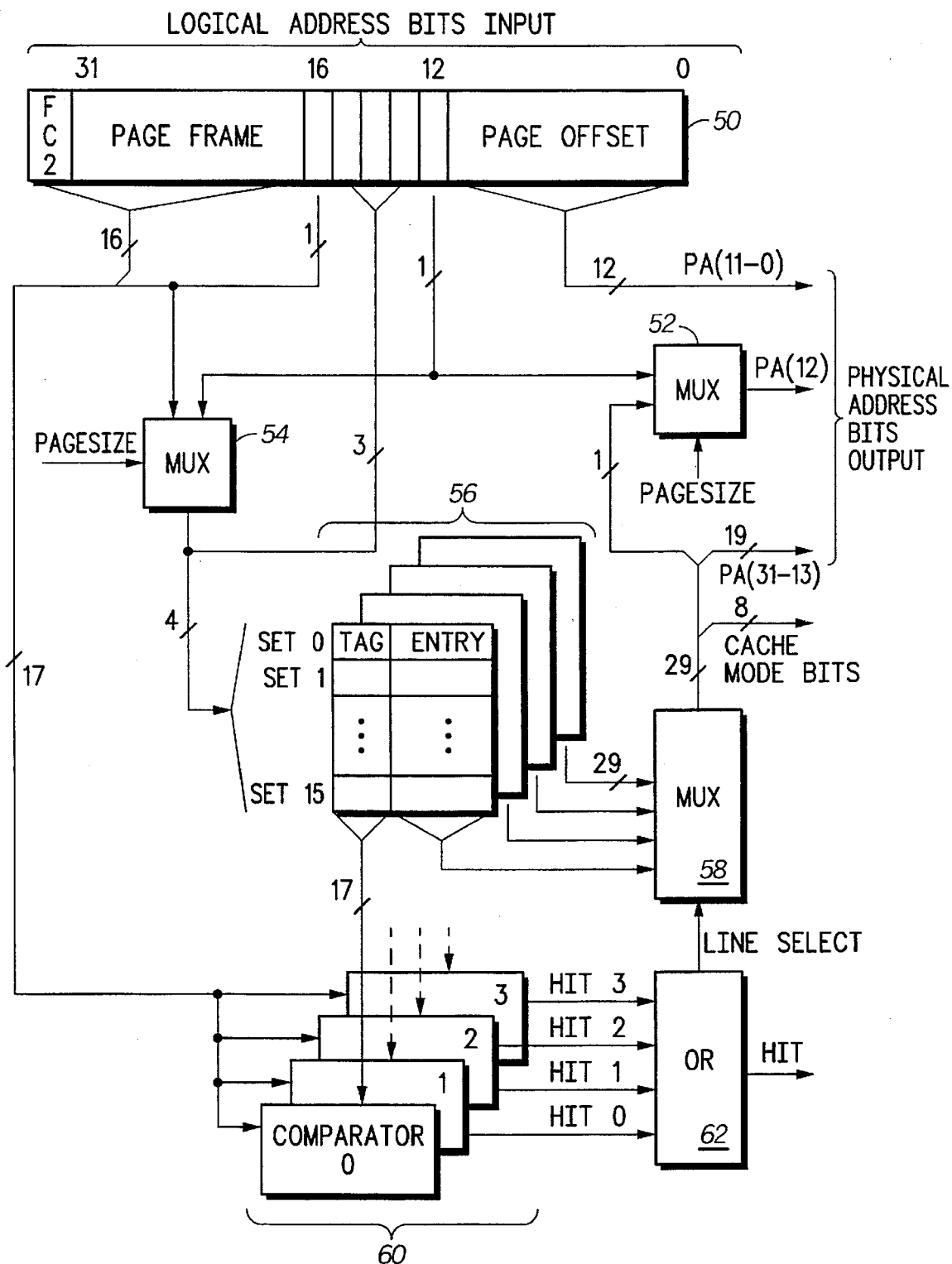
FIG. 5 illustrates, in a block diagram, an address translation cache (ATC) of FIG. 3 in accordance with the present invention.

FIG. 5 illustrates a detailed organization of the ATC 40 of FIG. 3. In the preferred embodiment, the ATC 40 implements a 64-entry cache organized in a four-way set-associative manner with 16 sets. Other ATC configurations are known in the art and may be used herein. FIG. 5 illustrates a logical address 50. The logical address 50 has least significant bits referred to as a page offset. The page offset may be either 11 bits long or 12 bits long which indicates either a 4K byte memory page size or an 8K byte memory page size, respectively. Four of the five bits labeled bits 12 through 16 in FIG. 5 logical address 50 are used to indicate a row location in a sixteen-row four-way set associative cache unit 56. A page frame portion of logical address 50 is a group of bits which are compared, via a comparator unit 60, to logical page frame tag values stored in the unit 56. A multiplexer (MUX) 54 and a multiplexer (MUX) 52 choose one of either the bit 12 or the bit 16 of the logical address 50 depending upon the MMU page size (i.e. either 4K bytes or 8K bytes). Bit 16 is selected by MUX 54 when 8K byte MMU pages are used, and bit 12 is selected by MUX 54 when 4K byte MMU pages are used. Pagesize is a control signal which indicates one of either 4K page mode or 8K page mode. If the 8K MMU mode is chosen, then the MUX 52 outputs the logical address bit 12 of the logical address 50 as the physical address bit 12 [i.e. PA(12)]. If the 4K MMU mode is selected, then the MUX 32 outputs a cached bit from the unit 56 as the physical address bit 12 [i.e. PA(12)].

The cache unit 56 is four-way set associative. Therefore, after either bits 12–15 or bits 13–16 (depending upon page size) are used from the logical address 50 to determine/ decode one of the sixteen rows in unit 56, all four tags within a particular decoded row are compared to the page frame to determine if the address translation of the logical address 50 is contained in the unit 56. If the address translation of the logical address 50 is contained within the unit 56, one of the signals Hit 3, Hit 2, Hit 1, or Hit 0 will be asserted. An OR section 62 compacts the four Hit signals from unit 60 to one HIT signal. The OR section 62 informs a MUX 58, via a signal "Line Select", which of the four entries to read out of the cache if a cache hit occurs. If the address translation is found within the ATC 40, then the physical address is output via the lines labeled "Output". If no cache hit occurs within the ATC 22, then the MMU 32 invokes the tablewalk controller 42. The output has least significant bits (LSBs)

formed by the Page Offset and most significant bits (MSBs) formed by data from the unit 56.

Figure 7:
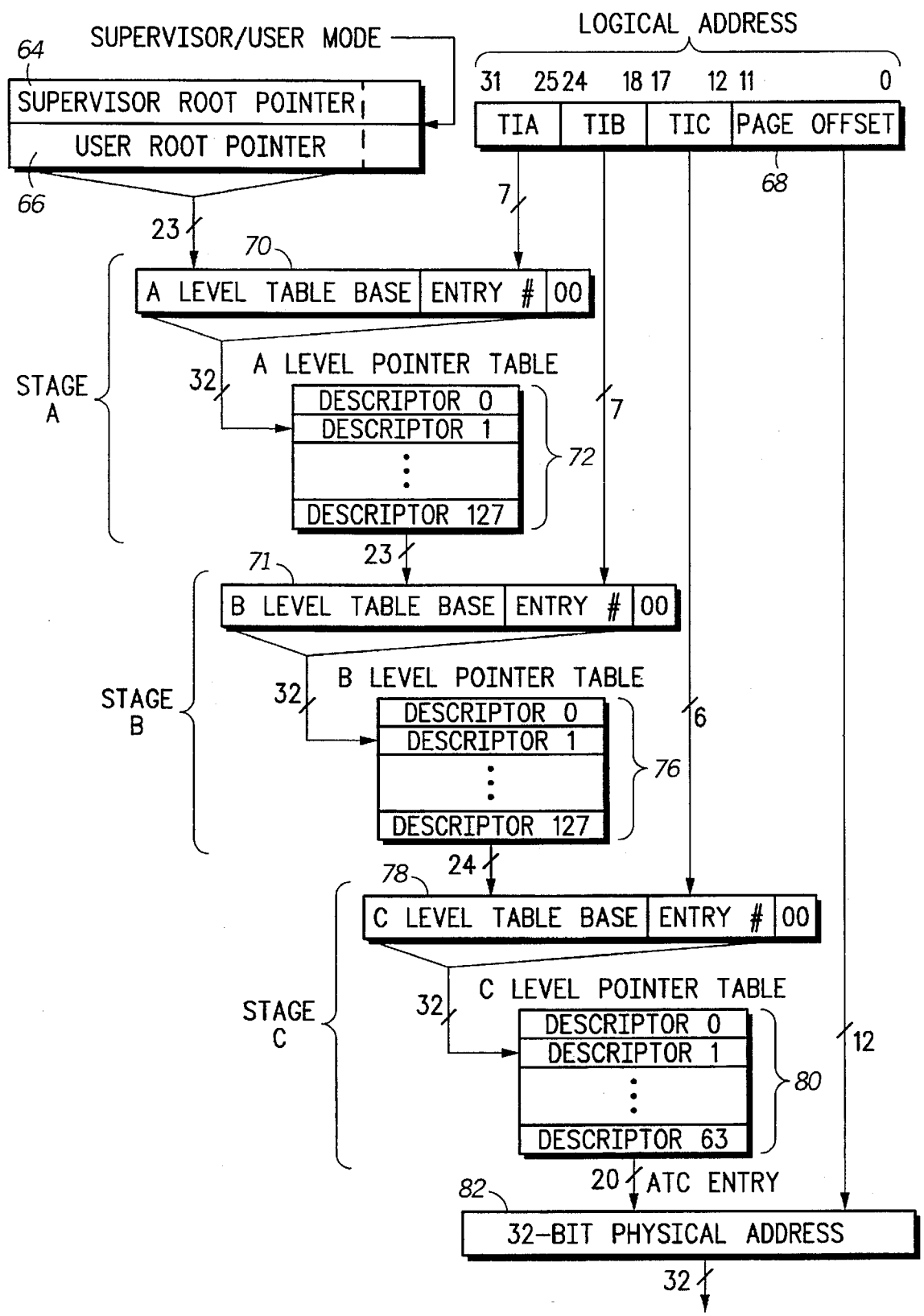
FIG. 7 illustrates, in a block diagram, a manner in which table walking occurs in the table walk controller of FIG. 3 in accordance with the present invention.

FIG. 7 illustrates the operation of the tablewalk controller 42 of FIG. 3 in more detail. FIG. 7 illustrates a typical tablewalk method using a 4K byte page size. FIG. 7 illustrates a logical address 68. Logical address 68 is parsed into four distinct regions by the controller 42. One region is referred to as the Page Offset. A second region is referred to as Table Index A (TIA). A third region is referred to as a Table Index B (TIB). A fourth regions is referred to as Table Index C (TIC). TIA has seven bits, TIB has seven bits, and TIC has six bits as illustrated. In another form, the control signal labeled "Supervisor/User Mode" may be a bit 32 of the logical address (not illustrated). This bit 32 is referred to as the FC2 bit (see FIG. 6).

FIG. 7 also illustrates a supervisor root pointer 64 and a user root pointer 66. The root pointers 64 and 66 are each twenty-three bits long. The FC2 bit or a Supervisor/User Mode control bit is used to select between the root pointers 64 and 66. If the processor 10 is making a supervisor access (FC2=1), then root pointer 64 is chosen. If the processor 10 is making a user access (FC2=0), then root pointer 66 is chosen. In general, root pointers 64 and 66 allow for two sets of tablewalk memory arrays, one set for a user mode and one set for supervisor mode. Therefore, the user and supervisor modes may each have different address translations.

One of the root pointers 64 or 66 are used as an A Level Table Base in a tablewalk stage A. In stage A, the TIA bits from the logical address 68 are appended, as lower significant bits, to the A Level Table Base. A binary 00 is appended to the least significant side (i.e. right side) of the TIA bits in stage A. The binary 00 ensures that the A Level Table Base and the appended TIA bits access 32-bits, 4 memory bytes, or one memory longword (all these are equivalent in bit size). Together, the A Level Table Base, the appended TIA bits, and the appended binary 00 least significant bits form a table A address 70. Address 70 is an address of a 32-bit location in a memory table 72. Memory table 72 has 128 entries due to the fact that the TIA bits allow for 128 distinct addresses within the range of the A Level Table Base (which are the most significant bits). The address 70 accesses a single longword data value (referred to as one of a descriptor 0 through a descriptor 127). Twenty-three bits of the descriptor accessed by the address 70 in memory table 72 are used as a B Level Table Base for a Stage B of the tablewalk.

The B Level Table Base forms the most significant bits of a Table B address 71. The TIB bits of the logical address 68 are appended to a lower significant portion of the address 71 along with least significant binary 00 bits in a manner similar to Stage A. The address 71 is used as a pointer into a memory array 76 in Stage B. The array 76 has 128 longword locations due to the fact that the TIB contains seven bits (i.e. $2^7=128$). A 24-bit value is taken from the array 76 as addressed by the address 48 and used as a C Level Table Base in a Stage C.

The C Level Table Base is appended to the six TIC bits with an appended binary 00 as indicated in FIG. 7 to form a Table C address: 78. The address 78 indicates one location within a 64 longword memory array 80 (64 locations are required for Stage C because TIC has 6 bits). One of the sixty-four locations in the array 80 contains the translated twenty most significant bits of the 32-bit physical address. The twenty bits from array 80, a logical address tag field, and other optional tag bits/control bits are transferred from the tablewalk controller 42 to the ATC 40 as illustrated in FIG. 3 and FIG. 7 (see the data connection between ATC 40 and controller 42 in FIG. 3). The Page Offset of the logical address 68 are used to form the least significant bits of the physical address 82 and the twenty bits from the array 80 are used to form the most significant bits of the physical address 82. Memory arrays 72, 76, and 80 are located in external memory 22 (see FIG. 1).

Figure 8:
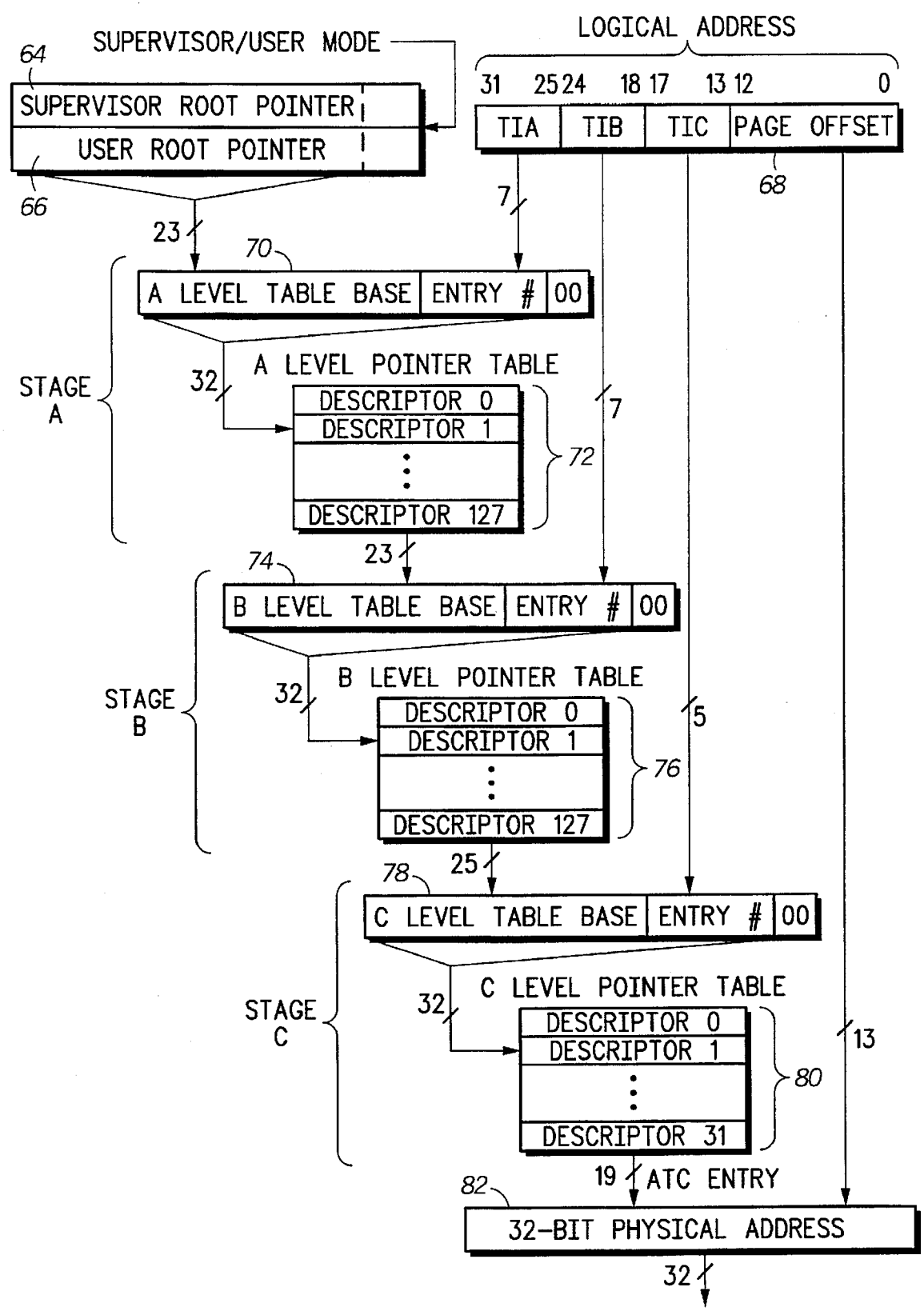
FIG. 8 illustrates, in a block diagram, another manner in which table walking occurs in the table walk controller of FIG. 3 in accordance with the present invention.

FIG. 8 illustrates a typical tablewalk for MMU 32 when an 8K byte page size is utilized. The elements in FIG. 8 which are analogous to elements in FIG. 7 are labeled identically. The only significant difference between FIGS. 7 and 8 is that the number of bits in the Page Offset, the used bits in the Arrays 76 and 80, and the number of TIC bits are different between FIGS. 7 and 8. The operation of the tablewalk in FIG. 8 is similar to the tablewalk of FIG. 7 and is therefore not discussed further.

Specific numbers of bits, specific memory sizes, specific number of stages, specific type of logical address parsing sizes, and specific address sizes, were discussed above to present a preferred embodiment. It should be apparent that other numbers of bits, other memory page sizes, other parsing schemes, other address sizes, and a different number of tablewalk stages may be used in FIGS. 7 and 8.

Figure 9:
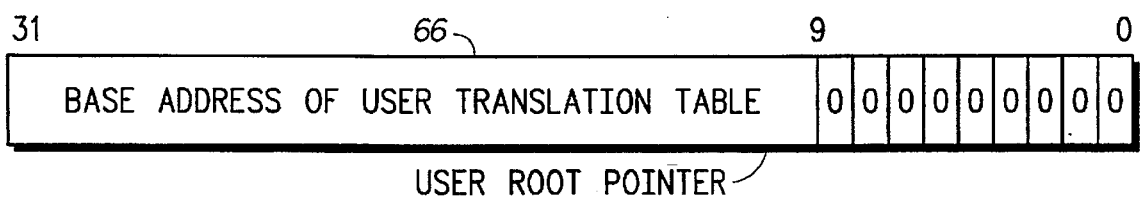
FIG. 9 illustrates, in a block diagram, a user root pointer configuration in accordance with the present invention.
Figure 10:
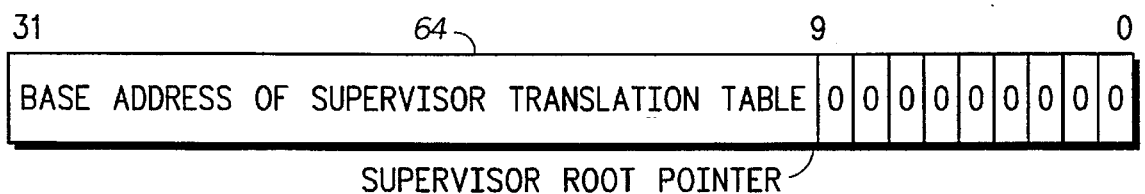
FIG. 10 illustrates, in a block diagram, a supervisor root pointer configuration in accordance with the present invention.

FIG. 9 illustrates the user root pointer of FIGS. 7–8 in more detail and the FIG. 10 illustrates the supervisor root pointer of FIGS. 7–8 in more detail.

Figure 11:
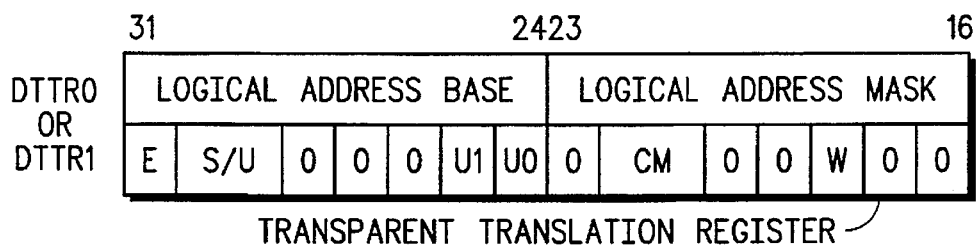
FIG. 11 illustrates, in a block diagram, a configuration of a transparent translation register (TTR) in accordance with the present invention.

FIG. 11 illustrates a specific data transparent translation register (DTTR) which may be used as one or both of DTTR 136 and/or 138 in FIG. 4.

Figure 12:
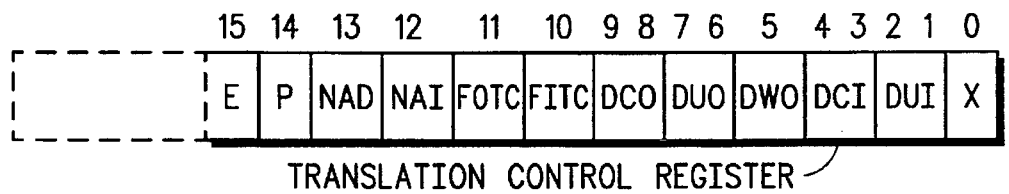
FIG. 12 illustrates, in a block diagram, a configuration of a translation control register (TC) in accordance with the present invention.

FIG. 12 further illustrates bit positions of the translation control register 132 of FIG. 4.

Figure 13:
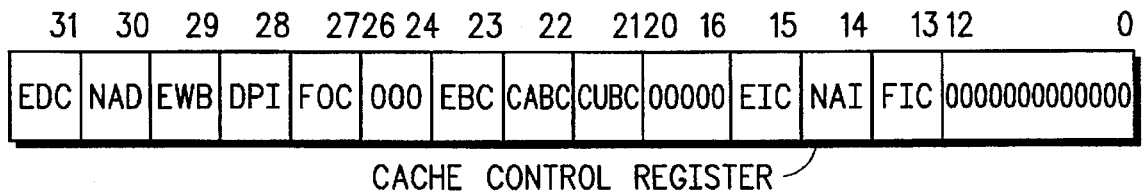
FIG. 13 illustrates, in a block diagram, a configuration of a yet another register in accordance with the present invention.

FIG. 13 illustrates specific bit positions of the cache control register 134 of FIG. 4.

The register illustrated in FIGS. 9–13 are further discussed in detail below. FIG. 12 illustrates, in more detail, the translation control (TC) register 132. The fields in the TC register 132 of FIG. 12 are as follows:

X or 0=reserved for future use; always reads "0"

E=translation enable

P=page size (0=4 k, 1=8 k)

NAD=no allocate mode, data ATC

NAI=no allocate mode, instruction ATC

FOTC=½ cache mode, data ATC

FITC=½ cache mode, instruction ATC

DCO=default cache mode OCU (operand cache unit) (two bits)

DUO=default UPA bits OCU (two bits)

DWO=default write protect OCU

DCI=default cache mode ICU (instruction cache unit) (two bits)

DUI=default UPA bits ICU (two bits)

The default cache mode, UPA, and write protect bits are used for the case of translation disabled and no TTR hit. That is, if a given logical address is not mapped by the TTRs 136 and/or 138 and if address translation is disabled, the MMU 32 invokes default transparent translation. The cache mode (CM), user page attributes, and other TTR fields for the default translation are defined by contents of the Translation Control Register 134. The TC register default TTR contents after RESET are:

cache mode="write-through", UPA="00", and no write protection.

FIG. 13 illustrates, in more detail, the CACR register 134. The fields in the CACR register 134 of FIG. 13 are as follows:

X=reserved for future use; always reads "0"

EDC=enable data cache
NAD=no allocate mode data cache
EWB=enable write buffer
DPI=disable CPUSH Invalidation
FOC=data cache half cache mode
EBC=enable branch cache
CABC=clear all branch cache
CUBC=clear all user entries branch cache
EIC=enable instruction cache
NAI=no allocate mode instruction cache
FIC=instruction cache half cache mode The EWB (enable write buffer) bit is used by the programmer to enable and disable the write buffer.

FIG. 11 illustrates, in more detail, the DTTR0 136 and DTTR1 138 registers. The fields in the TTR register of FIG. 1 are as follows:

X=reserved for future use; always reads "0"
LAB=logical address base
LAM=logical address mask
E=enable bit
S/U=supervisor/user hit control
U1=user page attribute bit 1
U0=user page attribute bit 0
CM=cache mode bits
W=write protect bit mode bits The TTRs allow portions of the logical address space to be transparently mapped and accessed without resident entries in an ATC 40 and without a tablewalk (see tablewalk controller 42). Each TTR or register 138 and 136 can be used to define a range of logical addresses using a base and mask, providing read only protection and the ability to specify cache mode. The ranges are in multiples of 16 Megabytes and may overlap. If both a transparent translation register (TTR) and an ATC (address translation cache) entry match a logical address, then the transparent translation register (TTR) takes precedence and the ATC 40 entry is ignored.

For a given access, if either of the transparent translation registers 136 or 138 sees a match, the access is transparently translated. If both TTRs match, all status bits are used from TTR0 only (i.e., TTR0 has precedence over TTR1 in FIG. 4).

FIG. 9 illustrates, in more detail, the USER ROOT POINTER (URP) 66 of FIGS. 7–8. The fields in the URP register of FIG. 9 are as follows:

bits 8 thru 0=reserved for future use; always reads "0"
bits 31 thru 9=Base Address of User Translation Table The User Root Pointer (URP) is a 32-bit register containing a pointer to the base of the user translation table tree in physical memory space (usually in memory 22 of FIG. 1) that describes the logical-to-physical address translation for user space. The URP 66 is used if the function code indicates the logical address is for user memory space.

FIG. 10 illustrates, in more detail, the SUPERVISOR ROOT POINTER (SRP) 64 of FIGS. 7–8. The fields in the SRP register 64 of FIG. 10 are as follows:

bits 8 thru 0=reserved for future use; always reads "0"
bits 31 thru 9=Base Address of Supervisor Translation Table The Supervisor Root Pointer (URP) 64 is a 32-bit register containing a pointer to the base of the user translation table tree in physical memory space (usually in memory 22 of FIG. 1) that describes the logical-to-physical address translation for supervisor space. The SRP 64 is used if the function code indicates the logical address is for supervisor space.

Given the above discussion, an overall summary of the operation of the data processor 10 is possible. When discussing the operation, references to FIGS. 9–13 may be made to identify which system register is being used to perform certain functions.

The following is a brief description of general flow of an external write operation. A write request from pipeline execution unit 14 (FIG. 1) is received by the data cache unit 16 (FIG. 1). The logical address associated with the write request is translated to a physical address by MMU 32 (FIG. 2). MMU 32 also provides cache mode bits associated with this logical address. If the write operation needs to perform an external write and no internal fault has occurred, the data cache unit 16 will then execute the external portion of the write operation in a precise or imprecise mode based on the cache mode bits.

A human user control of the fault model is discussed below. The data processor 10 has write fault model logic which controls the use of a write buffer 34 and a push buffer 36 (see FIG. 2). The external write fault logic consists of control registers in the MMU 32 (specifically in a portion referred to as the MMU programmer's model 38 of FIG. 3) and a related control logic section of the data processor 10. The push buffer 36 consists of a buffer that can hold one (or more) cache line(s) of information and related control logic. For a preferred data cache the push buffer 36 is 16 bytes wide, although any number of bits/bytes may comprise the buffer 36. The write buffer 34 consists of a write first-in first-out (FIFO) buffer and related control logic. In the preferred form, the FIFO has four entries although any number of entries from one to several thousand may be used.

The programmer controls the fault model for an external write on a virtual address basis. This is accomplished by setting the cache mode (CM) field in the page table entry (PTE) (see FIGS. 18 and 19), the transparent translation registers (TTRs) (see FIG. 11) or the default cache mode bits in the translation control register (TC) (see explanation of FIG. 12).

Based on the type of instruction, whether the TTRs 136 and 138 are enabled, and whether virtual translation mode is enabled, an effective cache mode is calculated for every memory reference. Note that when virtual translation mode is disabled, the virtual and physical address are equivalent (i.e. no address translation occurs). The effective cache mode can be encoded as a two bit bus, CM[1:0]. It should be noted that one or more bits may be used as cache mode (CM) bit(s). The CM field (using two bits) is as follows for all normal operand references:

CM=00→cachable store-through—may use write buffer
CM=01→cachable copyback—will use push buffer if needed
CM=10→non-cachable precise—may not use write buffer
CM=11→non-cachable imprecise—may use write buffer The default cache mode bits in the translation control register (TC) (see FIG. 12) are forced to cachable store-through mode by reset and may be loaded to another appropriate value by the human user of processor 10. This loading by the user is done by a supervisor mode only instruction, referred to as a MOVEC (move control). The default cache mode (wherein control/status bits, including the CM bits, are taken from a default register location instead of a TTR or a cache) is used for the effective cache mode whenever virtual mode is disabled and there is not a TTR hit.

The transparent translation registers (designated DTTR0 136 and DTTR1 138 in FIG. 4) are set invalid (not used) by reset and may be set valid by the user. Although two data TTRs (DTTRs) are illustrated herein one or more TTRs may be used for data or instruction values. After reset, the user also loads the TTR's cache mode field. This also done via a MOVEC instruction. For every normal operand reference, the operand address is checked against the valid TTR's base and mask. If a match occurs (if the logical address of the operand reference is within a range specified by bits in the TTR), the TTR's cache mode is used for the effective cache mode. If multiple TTRs match, the lowest order TTR (DTTR0) has priority.

If virtual mode is enabled (enabling virtual to physical address translation) and there is no TTR match, operand addresses are translated to physical addresses based on tables of pointer and page entries built by the user and stored in memory (see FIG. 5 for a general overview of logical address translation, and FIGS. 7–8 for a specific discussion of logical address translation).

When a valid page table entry (PTE) is obtained in the MMU 32 (in the address translation cache 40 of FIG. 3, for instance), the valid PTE contains a cache mode field. This cache mode field will be used as the effective cache mode for this operand or operation. Finally, certain instructions and operations have an implied cache mode of non-cachable precise. This includes all locked operations such as TAS (test and set an operand), CAS (compare and swap with an operand), any other read-modify-write operations that are forced to be contiguous, and all writes to the stack for fault processing. Therefore, some instructions may ignore or over-ride the CM bits regardless of the logical address translation and perform a precise write operation. Furthermore, in some modes of operations (for example, when faults are being processed), all write operations are forced to be precise regardless of the CM bits.

Therefore, the effective cache mode can be controlled by the user in the same manner that the user controls address translation. All the flexibility and performance features used by address translations are used to build the effective cache mode and through this mechanism the fault model applied to writes. For the processor 10, this includes an address translation cache (ATC 40, FIG. 3) to improve virtual to physical translation performance and separate root pointers for user or supervisor operand references (see FIG. 6).

A general description of the write buffer 34 is as follows. The write buffer 34 is enabled by a control bit in a cache control register 134 (CACR, see FIGS. 4 and 13). If this bit is negated, the write buffer 34 is disabled. This control bit is negated by reset and may be loaded to an appropriate logic value by the user. If write buffer 34 operation is disabled, all external write operations have a precise fault model and do not use the write buffer 34. If the write buffer 34 is enabled, external write operations from cachable store-through or non-cachable imprecise pages will use the write buffer and be imprecise. Note that all write operations that use the write buffer 34 have an imprecise fault model. Note also that the processor 10 performs, in one form, all external write bus operations in strict program order. There is, in this case, no need for an explicit sequential operand mode.

The push buffer 36 is used whenever the cache has modified data that must be pushed to external storage (i.e. memory 22—see FIGS. 1 and 2). The use of push buffer 36 may be caused-by cache line allocations, cache mode mismatches or explicit cache push instructions. It is also used by a cache line move instruction (MOVE16). The push buffer 36 allows an external cache line read (a line of cache data coming from external memory which is to be data cached) that displaces a modified cache line (i.e., displace a data cache line already residing in the data cache which must be written to external memory to preserve data coherency) to start before the external cache line write for the displaced modified line begins. The processor 10 may resume execution after a cache miss before the associated line push completes. For all cache line allocations, a resulting line push is imprecise. That is, if this push terminates in a bus error, the fault may point to an instruction after the one that caused the push.

A more detailed description of the write buffer 34 and its operation is as follows. The write buffer 34 is between the data cache 30 and the bus interface unit 30, as illustrated in FIG. 2, and is used to hold write commands having one or both of addresses and data. The write buffer 34 is a FIFO which is four locations "deep" and each location holds one bus command (e.g., a write operation). On write operations that use buffer 34, the processor 10 is free to continue subsequent instruction processing as soon as the write buffer accepts the write operation. That is, there is no pipeline stall for this case and parallel processing is occurring in the processor 10. The write buffer 34 increases external write performance by decoupling a processor write operation from the external write operation to allow parallel operation. If the write buffer 34 is full, the processor will stall on a subsequent write until a location becomes free in buffer 34.

The pipeline execution unit sends the write command and other control, the write address, and the write data to the data cache unit over the control, address and data line between these two units (see FIGS. 1–2). The address translation cache (ATC 40) of FIG. 3, the table walk controller 42 (of FIG. 3), and related logic of the MMU 32 is used to translate the logical address if needed, check for TTR 136 and 138 hits and check default control information. If the effective cache mode is cachable store-through or non-cachable imprecise and the write buffer 34 is enabled and not full, the translated write address and the write data along with the corresponding bus interface write control is stored in the write buffer 34. This may continue as long as the write buffer 34 is not full.

At the same cycle that the first write buffer 34 entry is made, the corresponding bus interface unit request is made via BIU (bus interface unit) 20. This is done via the control lines between the data cache unit 16 and the bus interface unit 20 (see FIG. 1). The corresponding physical address and data are placed on the address and data lines between the units 16 and 20 (FIG. 1). The bus interface unit (BIU) 20 will use the next available bus cycle to generate the appropriate write cycles external to the processor 10 (see FIG. 1—external bus). The BIU 20 will also signal the data cache unit 16 when it accepts the request. The corresponding write buffer entry is then removed from the write buffer 34.

A detailed description of the push buffer 36 (FIG. 2) and it's operation is as follows. In general, the push buffer 36 may be described as follows. The push buffer 36 is located between the data cache 30 and the bus interface unit 20 and is used to hold push commands, addresses and data. The push buffer 36 in the processor 10 can hold one address and one cache line (16 bytes) of data, in one form. Once the push buffer is loaded with a valid push operation and all higher priority data cache to bus interface unit (BIU) 20 requests have been serviced, a push request is sent to the BIU 20 (see FIG. 3). The corresponding physical address and data are placed on the address and data lines between the BIU 20 and the push buffer 36. The bus interface unit (BIU) 20 will use the next available bus cycle to generate the appropriate external line write cycles. The BIU 20 will also signal the data cache unit 16 when it finishes the request. The push buffer 36 valid bit is then cleared.

A description of fault processing within the processor 10 is as follows. In general, the processor 10 handles precise and imprecise faults in a novel manner. Any external operand read or write operation that does not use the write buffer 34 will stall if the write buffer 34 has a valid entry. Normal operation will continue when the write buffer 34 is empty. Additionally, certain instructions which synchronize the pipeline 14 guarantee both buffers 34 and 36 are empty before proceeding. Push buffer and write buffer bus write operations that terminate with a TEA (Transmission Error Acknowledge) cause push buffer and write buffer faults respectfully. These are imprecise faults. If no subsequent fault has occurred, these faults are processed on the next instruction boundary.

For the case of a push buffer 36 or write buffer 34 fault and any other subsequent fault, the following occurs (see detailed description of the flow chart in FIG. 14 below). When the processor detects any exception condition, all instruction execution is aborted and the exception processing state entered. Upon entering this state, the pipeline execution unit 14 will stall until both buffers 34 and 36 are empty before beginning the exception processing. If either buffer 34 or 36 receives a TEA termination for a write cycle, the corresponding buffer fault is recorded and the buffers continue to sequence through all pending writes. Once the buffers 34 and 36 are both empty, the pipeline 14 re-evaluates the pending exception types. If no TEA (transmission error acknowledge) fault occurred during the emptying of the buffers, the processor continues with the original exception. If a TEA fault did occur as the buffers 34 and 36 were emptied, the original exception is discarded and a bus error is taken. The exception stack for the bus error includes an indicator bit that signals the occurrence of the push buffer TEA or write buffer TEA. Note that both errors may be present within a single bus error exception. The exception stack frame will record the program counter value at the time the exception was detected, but this value does not identify the instruction that caused the push or write buffer entries to originally be made because the model is imprecise.

Figure 14:
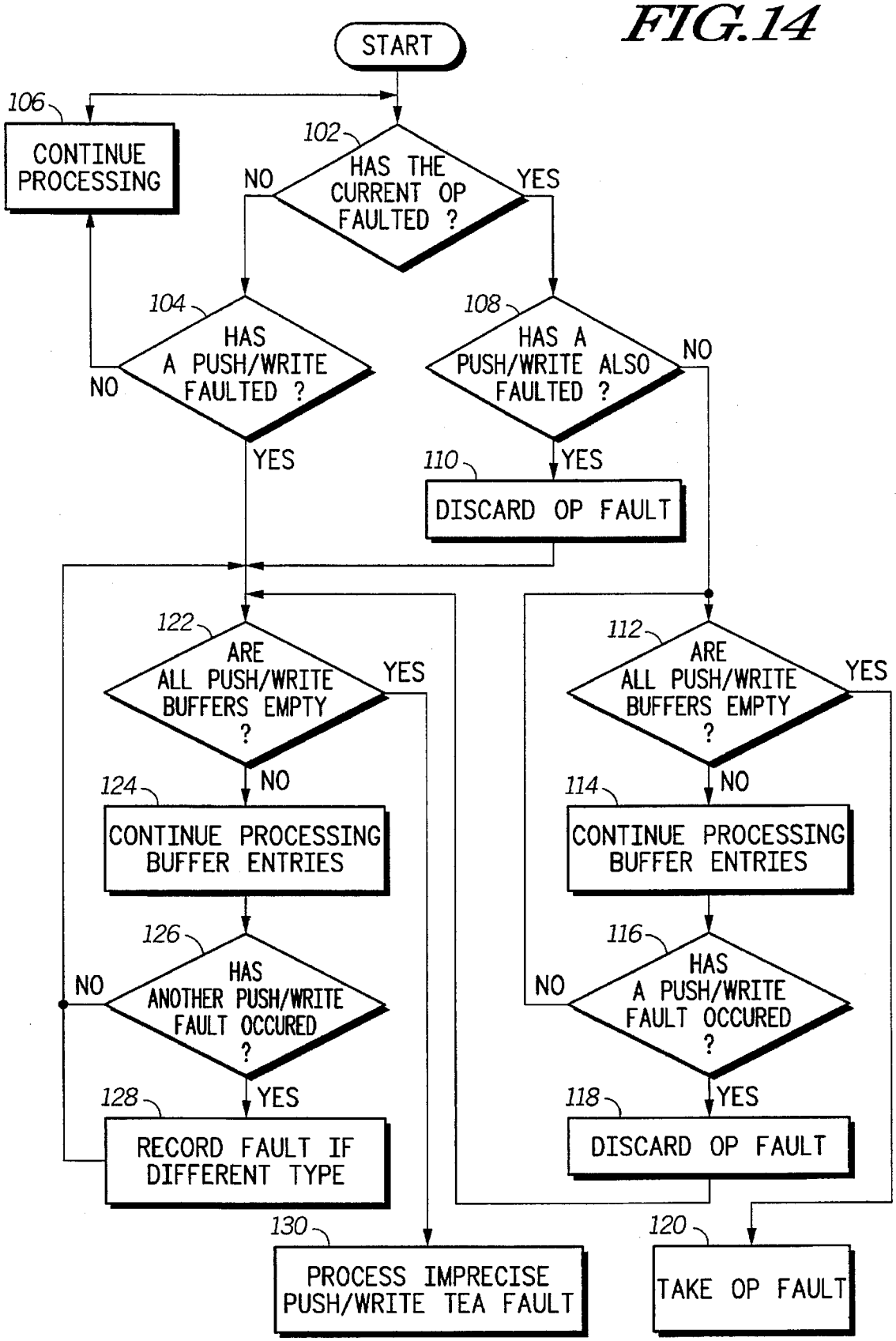
FIG. 14 illustrates, in a flowchart, a method for handling operation faults and write buffer/push buffer faults in the data processing system of FIG. 1 in accordance with the present invention.

Fault handling for precise and imprecise faults is shown in detail in the flow chart in FIG. 14. Before any pipeline execution unit 14 operation (OP) can complete, its fault status is checked (step 102 in FIG. 14). If the current operation (OP) is free of internal faults, a check is made to see if a push buffer or write buffer fault occurred while the current operation was executing (step 104 in FIG. 14). If not, the current operation is allowed to complete and the next operation is started by the pipeline execution unit 14.

If the current operation is free of internal faults (the NO path of step 102 in FIG. 14) and a push or write buffer fault has occurred (the YES path of step 104 in FIG. 14), fault processing is started for an imprecise fault. First, the push and write buffers 36 and 34 are checked for any pending writes (step 122 in FIG. 14). If the buffers are not empty, push and write buffer entries continue to cause/initiate bus write operations (step 124 in FIG. 14). As each push or write buffer bus write cycle completes, the fault status is checked (step 126 in FIG. 14). If another push or write buffer fault occurs, the fault indicator is set, if not set already (step 128 of FIG 14). Note that in the specific implementation shown here, which is not the only possible implementation, there is a single indicator for push buffer faults and a single indicator for write buffer faults. Therefore, it is possible to have both of these set in a given fault frame. Also, though not implemented for buffers 34 and 36 in the FIG. 2, it would be possible to make these indicators counters, such that the number of each type of fault is recorded. After all pending push and write buffer operations have completed, the imprecise transmission error acknowledge (TEA) fault is processed (step 130 in FIG. 14).

If the current operation faults (the YES path of step 102 in FIG. 14), a check is made to see if a push buffer or write buffer fault occurred while the current operation was executing (step 108 in FIG. 14). If a push or write buffer has occurred (the YES path of step 108 in FIG. 14), the current operation fault is discarded (step 110 in FIG. 14) and fault processing starts for an imprecise fault (go to step 122 of FIG. 14—see detailed explanation above). Note that the current operation program counter (also known in the art as the instruction counter) is part of the information saved on any fault, precise or imprecise. Also, the system described uses an instruction restart fault model. That is, on any fault, precise or imprecise, all actions and updates from the operation that is being processed when the fault is taken are discarded. The imprecise fault, although it occurred in time after the internal fault on the current operation, is on an external write operation that is part of a previously executed instruction. This is why the imprecise fault has a higher priority than a fault on the current operation. For either a precise or imprecise fault, if the fault can be handled in such a way that the programmer wants to resume processing from the point of the fault, the instruction indicated by the program counter in the fault information is restarted.

If the current operation faults (the YES path of step 102 in FIG. 14) and a push or write buffer fault has not occurred (the NO path of step 108 in FIG. 14), the push and write buffers 34 and 36 are checked for pending bus write operations (step 112 of FIG. 14). If the buffers 34 and 36 are not empty, push and write buffer entries continue to cause bus write operations (step 114 in FIG. 14). As each push or write buffer bus write cycle completes, the fault status is checked (step 116 in FIG. 14). If a push or write buffer 36 or 34 occurs (the YES path of step 116 in FIG. 14), the current operation fault is discarded and fault processing starts for an imprecise fault (go to step 122 of FIG. 14—see detailed explanation above). If no faults occur (the NO path of step 116 in FIG. 14) and,the buffers 34 and 36 are empty (the YES path of step 112 in FIG. 14), fault processing for the internal fault on the current operation may proceed (step 120 in FIG. 14).

The following is a discussion of the programmer's model 38 illustrated in FIG. 4. There are four control registers in unit 38. These are a translation control register (TC) 132, a cache control register (CACR) 134, a data transparent translation register 0 (DTTR0) 136 and a data transparent translation register 1 (DTTR1) 138. These registers are detailed bit-by-bit in FIGS. 11–13.

A data path allows the pipeline execution unit 14 to read and write the registers contained in the MMU Programmers Model 38. A Transparent Translation Hit Logic section 140 determines if the logical address input to the MMU Programmer's Model 38 matches a valid TTR 136 or 138 and produces TTR hit indicators. A physical mode cache mode mux 142 selects among the cache mode (CM) fields in the TC register 132 and the DTTR registers 136 and 138 based on a TTR hit indicator.

The physical mode cache mode mux 142 selects as follows (in priority order):
1. If the logical address matches one (or more) valid TTR(s), then the physical cache mode is set to the cm field value of the lowest order matching TTR, else
2. the physical cache mode is set to the cm field value of the TC register.

While the present invention has been shown and described with reference to specific embodiments, further modifications and improvements will occur to those skilled in the art. For example, a single level data cache' structure is discussed herein. Multi-level cache structures are know in the art and may be used herein. Other modes of cache operation, such as cache bypass mode wherein the cache is not used, may be implemented with the system taught herein. Also, other ATCs are known in the art and may be used in the place of the ATC 40 discussed herein. The methods and structures taught herein may be used in any execution device such as microprocessors, digital signal processors, microcontrollers, and the like. The processor 10 may be a parallel device and contain several execution units. Plurality, as used herein, is used to indicate any number X of elements greater than one (i.e., $2 \leq X < \infty$) without limiting X to any one fixed value or any limited range of values other than $2 \leq X < \infty$. It is to be understood, therefore, that this invention is not limited to the particular forms illustrated and that it is intended in the appended claims to cover all modifications that do not depart from the spirit and scope of this invention.

What is claimed is:

1. A data processing system comprising:

a central processing unit (CPU); and a memory management unit coupled to the CPU for translating logical addresses to physical addresses for accessing a plurality of memory pages, the memory management unit providing at least one cache mode bit which indicates whether a write operation is to be precise or imprecise depending upon which memory page is accessed, a precise memory access being a first memory access where no other memory access is started until the first memory access is guaranteed to complete without faults and an imprecise memory access being a second memory access wherein other memory accesses are allowed to begin before the end of the second memory access, wherein the precise memory access is used to allow the data processing system to quickly identify, when a memory access fault has occurred, the first memory access as a faulting access, the first memory access being the faulting access since the first memory access is the only memory access occurring at the time when the memory fault access occurred; and a push buffer for buffering cache writes to external memory wherein the cache writes are used to write multiple bytes from a cache to memory in a single write operation, where the cache is coupled to the CPU.

2. The data processing system of claim 1 wherein the at least one cache mode bit is ignored and memory accesses are performed in a precise manner during fault processing, the ignoring of the at least one cache modes bits being performed only for a predetermined sub-set of instructions within a total instruction set of the data processing system.

3. The data processing system of claim 1 wherein the at least one predetermined instruction of the data processing system ignores the at least one cache mode bit and processes a memory access in a precise manner regardless of the at least one cache mode bit.

4. The data processing system of claim 1 further comprising:

a write buffer for buffering bus write operations.

5. The data processing system of claim 1 wherein the push buffer is used to temporarily store both a line of cache data from the data processing system and a physical address, the push buffer communicating the line of cache data to a bus interface unit (BUI) coupled within the data processing system for the purpose of storing the line of cache data in an external device.

6. The data processing system of claim 1 wherein a precise execution of one instruction is further characterized as being an execution of the one instruction wherein the data processing system executes one instruction at a time and waits for the one instruction to either finish fault-free or cause a fault before executing a next instruction.

7. The data processing system of claim 1 wherein an imprecise execution of an instruction is further characterized as being an execution of the instruction wherein the data processing system executes one or more bus write instructions in sequence without waiting for any instruction to receive fault information.

8. The data processing system of claim 1 wherein the memory management unit translates a logical address to a physical address by accessing at least one circuit selected from a group consisting of: a transparent translation register (TTR), an address translation cache (ATC), a table walk controller, and a default status bit register.

9. A data processing system comprising:

a central processing unit (CPU); and a memory management unit comprising:

an address translation cache for selectively providing physical addresses and at least one cache mode bit in response to a logical address;

a table walk control circuit for selectively providing physical addresses and at least one cache mode bit in response to a logical address; and at least one transparent translation register for selectively providing the at least one cache mode bit when a logical address is passed through the MMU as a physical address; and circuitry for receiving the at least one cache mode bit from the MMU and performing, in response to the at least one cache mode bit, a write operation selected from a group consisting of: an imprecise write operation and a precise write operations, the precise write operation allowing only one memory access to commence from beginning to completion at any given time for the purpose of allowing any fault that occurs during the execution of the precise write operation to be easily attributable to the precise write operation since the precise write operation is the only write operation capable of producing the fault since the precise operation is operating at the exclusion of all other potential write operations.

10. The data processing system of claim 9 wherein the at least one cache mode bit is ignored and memory accesses are performed in a precise manner during fault processing.

11. The data processing system of claim 9 wherein the at least one predetermined instruction of the data processing system ignores the at least one cache mode bit and processing a memory access in a precise manner regardless of the at least one cache mode bit.

12. A method for determining whether to perform a precise memory write access or an imprecise memory write access in a data processor, the method comprising the steps of:

decoding a data processor instruction to determine that the data processor instruction requires a memory write operation;

providing a logical address to which the memory write operation is to occur;

translating the logical address to a physical address or defaulting to transparent translation registers to replace the translating with other memory management operations;

providing at least one cache mode bit in response to receiving the logical address, the at least one cache mode bit being either asserted or deasserted based upon at least one bit of the logical address;

using the at least one cache mode bit to perform one of either a precise write operation or an imprecise write operation, a precise write operation being a write operation which is executed alone without any other write operations until the execution of the precise write operation is guaranteed to be fault-free, an imprecise write operation being a write operation wherein faults are not as closely monitored as for the precise write operation, the data processor handling a plurality of resulting faults that occur in a predetermined time period wherein two faults within the plurality of faults are of differing type.

13. The data processing system of claim 12 wherein the step of translating comprises:

translating the logical address to a physical address by accessing a circuit selected from a group consisting of: a transparent translation register (TTR), an address translation cache (ATC), a table walk controller, and a default status bit register.

14. A method for determining whether to perform a precise memory write access or an imprecise memory write access in a data processor, the method comprising the steps of:

decoding a data processor instruction to determine that the data processor instruction requires a memory write operation;

providing a logical address to which the memory write operation is to occur;

translating the logical address to a physical address based upon one of either an address translation cache, a table walk controller, or a transparent translation register;

providing at least one cache mode bit based upon the logical address translating step wherein the at least one cache mode bit is derived within one of either an address translation cache, a table walk controller, or a transparent translation register;

using the at least one cache mode bit to perform one of either a precise write operation or an imprecise write operation using the data processor, the precise write operation being a write operation which is executed without any other write operation being performed until the precise write operation is sure to finish with no faults, an imprecise write operation being a write operation which is executed in a manner than is not a precise write operation, the data processor handling a plurality of resulting faults that occur due to the precise or imprecise write operations.

15. A data processor system comprising:

a central processing unit (CPU) having access to a plurality of pages of memory;

a memory management unit (MMU) coupled to the CPU, the memory management unit (MMU) containing a plurality of cache mode bits where each cache mode bit in the plurality of cache mode bits corresponds to a page of memory in the plurality of pages of memory, each cache mode bit in the plurality of cache mode bits indicating whether access to a respective page of memory is to be precise or imprecise where precise accesses to memory enable a first method of memory fault detection within the data processor system and imprecise accesses enable a second method of memory access fault detection within the data processor system;

a data cache memory coupled to the CPU, the data cache memory having a copy-back operational mode comprising:

a write buffer having a plurality of storage locations for storing pending bus write operations which are used to write information from the data processor system to the plurality of pages of memory, the write buffer operating in either a precise or imprecise write mode depending upon the plurality of cache mode bits; and a push buffer for storing a pending bus line write operation from the cache to an external bus, the push buffer allowing the data cache memory to operate in the copy-back mode, the push buffer operating in either a precise or imprecise push mode depending upon the plurality of cache mode bits.

16. The data processing system of claim 15 wherein the write buffer is a first-in first-out (FIFO) buffer having at least four entries.

17. The data processing system of claim 15 wherein the push buffer is a first-in first-out (FIFO) buffer having at least two entries.

18. A data processor comprising:

a central processing unit (CPU) having access to a plurality of pages of memory;

a memory management unit (MMU) coupled to the CPU, the memory management unit (MMU) containing a plurality of cache mode bits where each cache mode bit in the plurality of cache mode bits corresponds to a page of memory in the plurality of pages of memory, each cache mode bit in the plurality of cache mode bits indicating whether access to a respective page of memory is to be precise or imprecise where precise accesses to memory enable a first method of memory fault detection within the data processor system and imprecise accesses enable a second method of memory access fault detection within the data processor system;

a data cache memory coupled to the CPU, the data cache memory having a copy-back operational mode, a write-through operational mode, and a cache bypass operational mode, the data cache memory comprising:

a write buffer having a plurality of storage locations for storing pending bus write operations for writing data information from the data processor system to an external memory; and a push buffer for storing a pending bus line write operation in order to write a line of cache data from the cache to an external bus external to the data processor, the push buffer being used to ensure that the external memory contains identical data to the data stored in the data cache to keep data in the system coherent.

19. A data processor comprising:

a central processing unit (CPU) which selectively allows for precise and imprecise memory writes to external memory wherein multiple memory write faults of different fault types that occur serially in time are processed via the CPU;

a data cache memory coupled to the CPU, the data cache memory having a copy-back operational mode for writing information from the cache to an external bus, the data cache memory being coupled to a push buffer wherein the push buffer is used to write data from the data cache memory to the external memory so that the external memory and the data cache memory can be brought into a state wherein both the external memory and data cache memory store identical information; and a write buffer having a plurality of storage locations for storing pending bus write operations wherein the pending bus write operations are to be processed in a sequential manner.

20. A method for resolving imprecise and precise faults within a data processing system, the method comprising the steps of:

(a) executing an instruction;

(b) determining if the execution of the instruction results in an internal fault;

(c) determining if a bus error occurred either during a write operation initiated from a write buffer or a push operation initiated from a push buffer if the instruction does not result in an internal fault;

(d) if the instruction did not result in an internal fault from step (b), the write operation initiated from the write buffer did not result in a write fault from step (c), and the push operation initiated from the push buffer did not result in a push fault from step (c), then performing steps (a) through (d) for a one or more additional instructions, else performing steps (e) through (g) to process the fault determined in one of steps (b) or (c);

(e) processing all operations in the push buffer and write buffer if the fault from step (d) is the internal fault and occurred due to the execution of the instruction;

(f) processing the fault from step (d) if the fault from step (d) is an instruction fault and if no write or push buffer fault occurs in step (e);

(g) ignoring the fault from step (d) if the fault from step (d) is the internal fault and if a push fault or write fault occurs in step (e), whereby the ignoring allows the push fault or write fault to be processed; and whereby the steps (a) through (g) ensure that a second fault that occurs after a first fault is also processed along with the first fault.

* * * * *